US010837205B2

(12) United States Patent
Ishiguro (10) Patent No.: US 10,837,205 B2
(45) Date of Patent: Nov. 17, 2020

(54) MOTOR VEHICLE DOOR LATCH DEVICE

(71) Applicant: GECOM CORPORATION, Greensburg, IN (US)

(72) Inventor: Katsuyuki Ishiguro, Novi, MI (US)

(73) Assignee: GECOM CORPORATION, Greensburg, IN (US)

( * ) Notice: Subject to any disclaimer, the term of this patent is extended or adjusted under 35 U.S.C. 154(b) by 360 days.

(21) Appl. No.: 15/320,396

(22) PCT Filed: Dec. 2, 2014

(86) PCT No.: PCT/JP2014/081829
§ 371 (c)(1),
(2) Date: Dec. 20, 2016

(87) PCT Pub. No.: WO2016/002101
PCT Pub. Date: Jan. 7, 2016

(65) Prior Publication Data
US 2017/0159334 A1  Jun. 8, 2017

(30) Foreign Application Priority Data
Jul. 1, 2014  (JP) .................................. 2014-135743

(51) Int. Cl.
*E05B 85/26*  (2014.01)
*E05B 83/18*  (2014.01)
(Continued)

(52) U.S. Cl.
CPC ................. *E05B 85/26* (2013.01); *B60J 5/00* (2013.01); *E05B 77/36* (2013.01); *E05B 81/06* (2013.01);
(Continued)

(58) Field of Classification Search
CPC .......... E05B 81/06; E05B 81/15; E05B 81/18; E05B 81/20; E05B 81/64; E05B 81/66;
(Continued)

(56) References Cited

U.S. PATENT DOCUMENTS 5,938,252 A * 8/1999 Uemura .................. E05B 81/20
292/201
5,979,951 A   11/1999 Shimura
(Continued)

FOREIGN PATENT DOCUMENTS

| JP | H09-303025 A | 11/1997 |
| JP | 10-266666 A  | 10/1998 |

(Continued)

OTHER PUBLICATIONS

Computer Generated Translation for WO 2014/173386 A1, Generated on Jan. 23, 2019, https://worldwide.espacenet.com/ (Year: 2019).*

(Continued)

*Primary Examiner* — Alyson M Merlino
(74) *Attorney, Agent, or Firm* — Davis & Bujold PLLC; Michael J. Bujold (57) ABSTRACT

A motor vehicle door latch device that prevents a latch from being held in a half-latch position when a door opens and enables itself to be smaller. The door latch device comprises a latch that is pivotally mounted via a first shaft to engage with a striker; a pawl that can hold the latch in a full-latch or a half-latch position; a memory lever pivotally mounted (Continued)

via a third shaft not to overlap the latch or the pawl, the memory lever enables holding the pawl in a release position without the full-latch position or half-latch position when the pawl rotates in a releasing direction from the full-latch position; and a releasing portion enabling the pawl to rotate from the release position to the half-latch or full-latch position when the latch rotates from the full-latch position toward an open position to be in between the half-latch position and the open position.

7 Claims, 8 Drawing Sheets (51) Int. Cl.
B60J 5/00 (2006.01)
E05B 77/36 (2014.01)
E05B 81/14 (2014.01)
E05B 81/06 (2014.01)
E05B 81/66 (2014.01)
(52) U.S. Cl.
CPC .............. *E05B 81/15* (2013.01); *E05B 81/66* (2013.01); *E05B 83/18* (2013.01)
(58) Field of Classification Search
CPC .......... E05B 81/68; E05B 85/26; E05B 77/36; E05B 83/16; E05B 83/18; Y10T 292/1047; Y10T 292/1082; Y10S 292/23; Y10S 292/29; Y10S 292/42
See application file for complete search history.

(56) References Cited

U.S. PATENT DOCUMENTS

| 2003/0038485 | A1* | 2/2003 | Schwaiger | E05B 81/14 292/201 |
| 2012/0061977 | A1* | 3/2012 | Takeda | E05B 81/20 292/201 |
| 2014/0225382 | A1* | 8/2014 | Kurita | E05B 81/20 292/201 |
| 2014/0252783 | A1* | 9/2014 | Yokota | E05B 81/20 292/196 |
| 2015/0267441 | A1* | 9/2015 | Fuchs | E05B 81/68 292/200 |
| 2015/0308161 | A1* | 10/2015 | Rosales | E05B 85/26 292/195 |
| 2016/0090759 | A1* | 3/2016 | Rosales | E05B 85/26 292/220 |

FOREIGN PATENT DOCUMENTS

| JP | 2001-329731 A | 11/2001 | |
| JP | 2010-174567 A | 8/2010 | |
| WO | WO-2014173386 A1 * | 10/2014 | ............. E05B 77/36 |

OTHER PUBLICATIONS

International Search Report Corresponding to PCT/JP2014/081829 dated Feb. 10, 2015.
Written Opinion Corresponding to PCT/JP2014/081829 dated Feb. 10, 2015.

* cited by examiner

MOTOR VEHICLE DOOR LATCH DEVICE

BACKGROUND OF THE INVENTION

The present invention relates to a motor vehicle door latch device having a full-latch engagement portion and a half-latch engagement portion.

For example, a door latch device in a liftgate of a motor vehicle comprises a latch that can engage with a striker of a vehicle body; an engagement member, such as a pawl or a ratchet, which engages with a full-latch engagement portion or a half-latch engagement portion to hold the latch and holds the liftgate in an ajar position or a fully-closed position; door opening means that comprises an electric actuator; and an opening lever for rotating the engagement member in a release direction to leave the full-latch or half-latch engagement portion with the door opening means.

In the door latch device, when the door is opened with the door opening means, the car is parked while it is inclined down forward, a repulsion force of a weather strip is decreased, or the periphery of the liftgate is frozen. Thus, if the liftgate is not sufficiently pushed up, the engagement member will likely engage with the full-latch engagement portion or half-latch engagement portion of the latch before the liftgate is opened. So the door cannot be opened or can be ajar. A single door-opening action does not open the liftgate.

A switch or a lever is operated again to disengage the latch from the engagement member, which is complicated.

JP2001-329731A and JP3143586B2 disclose a door latch device for solving the disadvantage.

In the door latch device in JP2001-329731A, when the opening lever is operated to open the door, the pawl is rotated by the opening lever to disengage from the latch. When the opening lever is operated to the releasing end, the holding lever is engaged with the opening lever, so that the pawl is held via the opening lever at a position where the pawl does not engage with the half-latch engagement portion or full-latch engagement portion of the latch.

In the door latch device in JP3143586B2, the half-latch preventing plate that comprises an arcuate projection is provided with the latch around the latch shaft. The pawl or ratchet comprises a projection-formed half-preventing lever which moves with the pawl when the pawl leaves the full-latch engagement portion during opening the door. When the door-opening action is made, the projection of the half-preventing lever goes over the arcuate projection not to return, so that the pawl does not engage with the half-latch engagement stage.

In the door latch device in JP2001-329731A and JP3143586B2, even in the circumstance, when the door is opened, the latch is prevented from being held at a full-latch position or a half-latch position.

However, in the door latch device in JP2001-329731A and JP3143586B2, the holding lever or the projection-formed half-preventing lever overlaps the latch or pawl, which prevents the door latch device from making smaller.

SUMMARY OF THE INVENTION

In view of the disadvantages, it is an object of the invention to provide a motor vehicle door latch device that prevents a latch from being held at a half-latch position when a door is opened, wherein the device can be made smaller.

DETAILED DESCRIPTION OF PREFERRED EMBODIMENT

Figure 10:
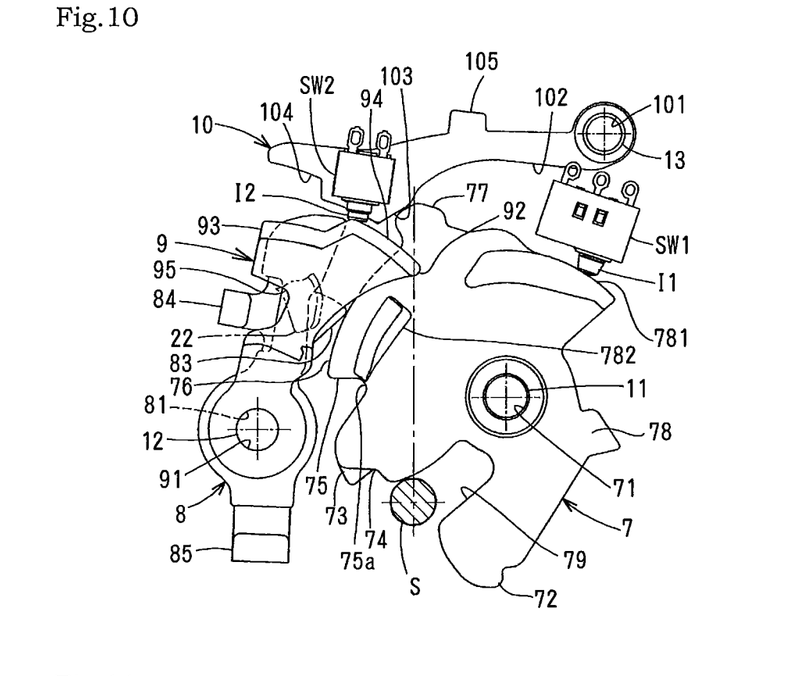
FIG. 10 is a top plan view of the main part of the door latch device when the door is opened.
Figure 11:
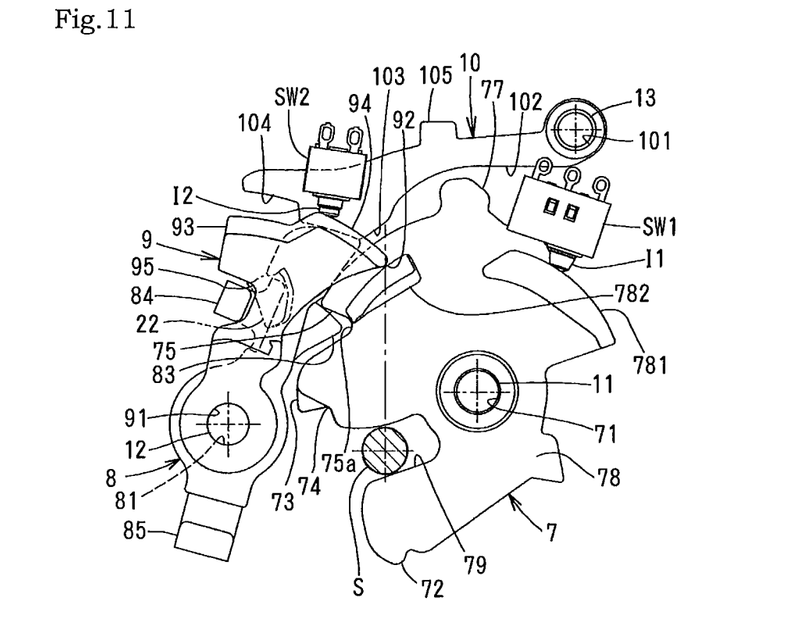
FIG. 11 is a top plan view of the main part of the door latch device when the latch is in a half-latch state.
Figure 12:
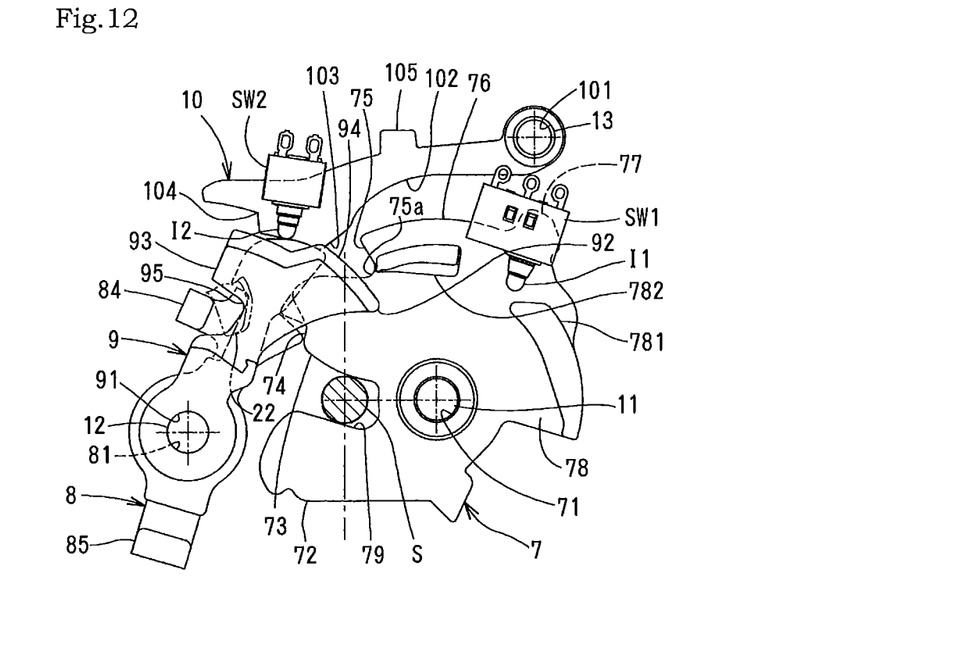
FIG. 12 is a top plan view of the main part of the door latch device when the door is closed.

An embodiment of a motor vehicle door latch device according to the present invention preventing a latch from being held at a half-latch position will be described with respect to the drawings. In the following description, the light and right in FIGS. 1 and 2 are deemed the front and back of a motor vehicle respectively; the top and bottom in FIG. 3 is the right and left of the motor vehicle; the bottom and top in FIGS. 4 to 12 are deemed the front and back of the motor vehicle; the left and right in FIGS. 4 to 9 are deemed the right and left of the motor vehicle; and the right and left in FIGS. 10 to 12 are deemed the right and left of the motor vehicle respectively.

Figure 1:
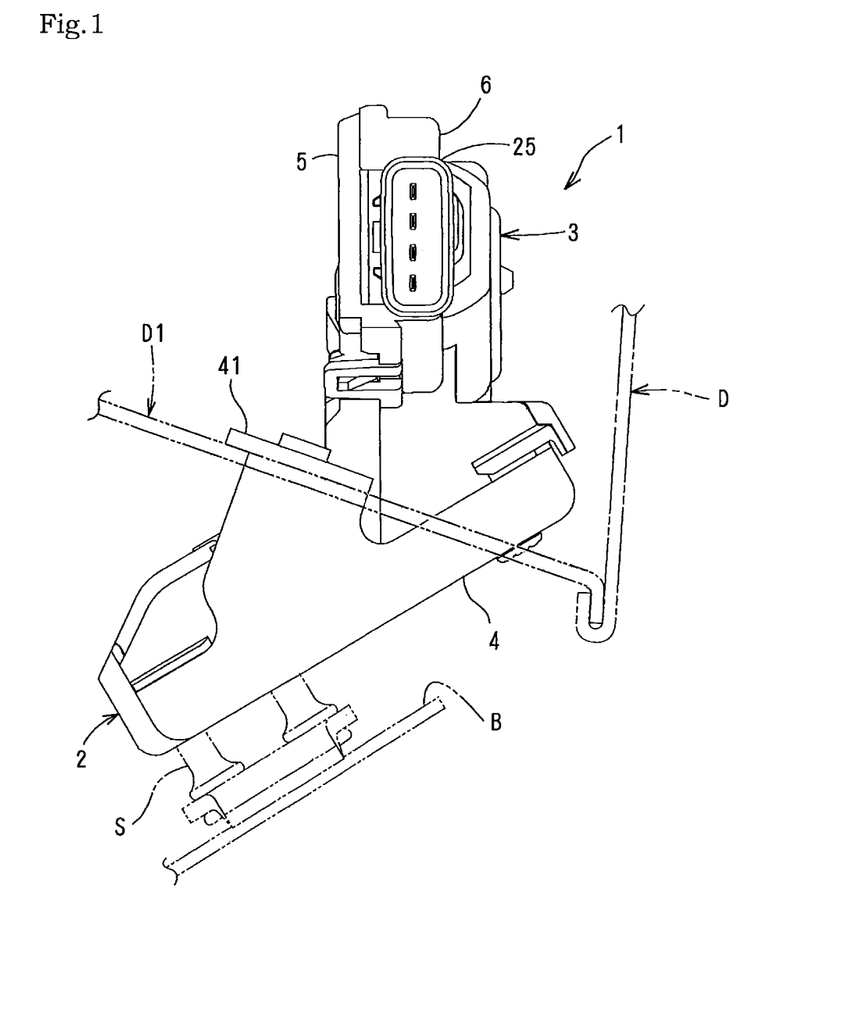
FIG. 1 is a side elevational view of an embodiment of a door latch device according to the present invention attached to a liftgate.

In FIG. 1, a door latch device 1 in this embodiment is mounted to a liftgate D pivotally attached vertically to the back of a vehicle body B of a motor vehicle, and comprises a latch mechanism 2 mounted to a lower panel D1 of the liftgate D tilted backward and downward to engage with a striker S fixed to the vehicle body B and an electric actuator 3 or a door opening/closing means which disengage the latch mechanism 2 from the striker S with opening action of the door D.

Latch Mechanism

Figure 2:
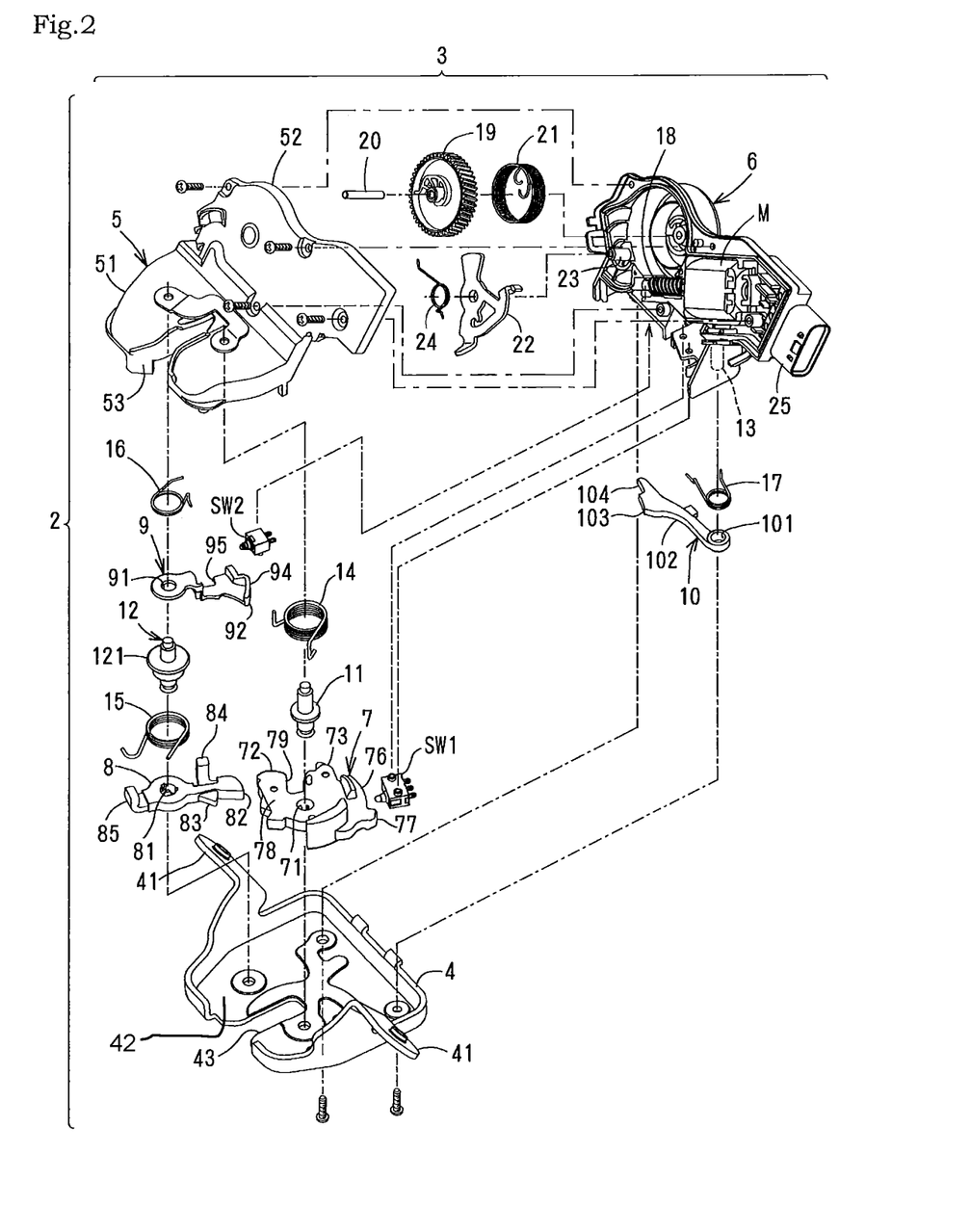
FIG. 2 is an exploded perspective view of the same.
Figure 3:
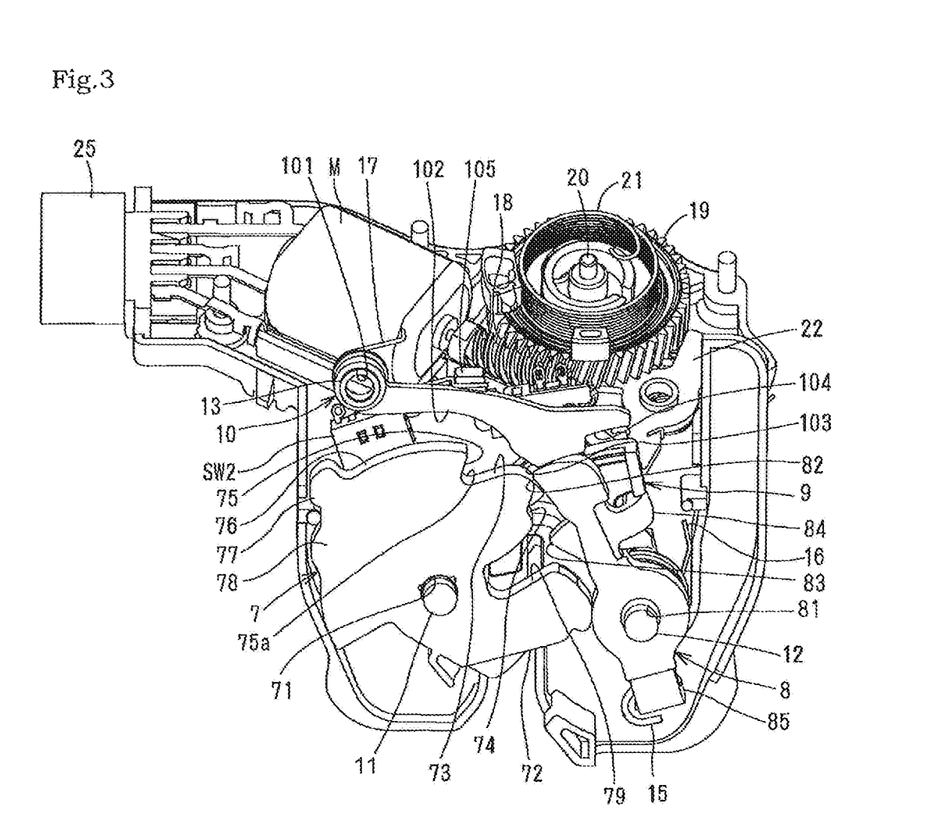
FIG. 3 is a back elevational view of the door latch device from which a cover member is removed.

In FIGS. 2 and 3, the latch mechanism 2 engages with the striker S to hold the door D closed, and comprises a housing for protecting driving portions including the latch 7 that can engage with and disengage from the striker S. The housing comprises a metal base member 4 like a shallow box that is open at the upper surface and an L-shaped synthetic-resin cover member 5 that comprises a horizontal surface 51 covering an upper surface of the base member 4 and a vertical surface 52 covering a front surface of the electric actuator 3. The base member 4 has a pair of flanges 41, 41 extending in the middle and is fixed to the lower panel D1 of the door D with a bolt (not shown) through the flanges 41, 41 in FIG. 1. In the middle of a bottom plate 42 of the base member 4 and the horizontal surface 51 of the cover member 5, there are formed striker-entering grooves 43, 53 in which the striker S comes from front when the door D is closed.

The latch mechanism 2 comprises a latch 7 that pivots with a vertical latch shaft 11 or a first shaft in a space between the base member 4 and the cover member 5 to engage with the striker S; a spring 14 urging the latch 7 to disengage from the striker S in a striker-releasing direction; a pawl 8 that can engage with the latch 7 to place the latch at a certain position; a spring 15 urging the pawl 8 to engage with the latch 7 in a latch-engaging direction; a switch lever 9 that comes in contact with the latch 7 to detect rotation of the pawl 8; a spring 16 urging the switch lever 9 to contact the outer circumferential surface of the latch 7; a memory lever 10 that can engage with the pawl 8 to hold and release the pawl 8 at a certain position; a spring 17 that urges the memory lever 10 to engage with the pawl 8 in a pawl-engaging direction; a first switch SW1 that turn ON/OFF by contacting or leaving the latch 7; and a second switch SW2 that turns ON/OFF by contacting or leaving the switch lever 9.

In FIG. 3, the latch 7 comprises an axial hole 71 in which the latch shaft 11 passes; and front and rear arms 72, 73 that face each other. At the end of the rear arm 73, there are formed a full-latch engagement portion 74 with which a pawl portion 83 of the pawl 8 can engage, and a half-latch engagement portion 75 that is adjacent to the full-latch engagement portion 74 counterclockwise in FIG. 3. On the outer circumferential surface of the latch 7 spaced counterclockwise from the half-latch engagement portion 75 in FIG. 3, there are formed a back 76 with which the pawl portion 83 of the pawl 8 can come in contact, and a projection 77 or a releasing portion that can rotate the memory lever 10 to disengage from the pawl 8 by contacting the memory lever 10 when the latch 7 rotates from the full-latch position to an open position.

The latch 7 has a resin-molded portion 78 molded except the full-latch engagement portion 74 and the half-latch engagement portion 75. In FIGS. 10 to 12, the molded portion 78 comprises a first protrusion 781 in which its side projects in a thickness direction arcuately around the latch shaft 11 to turn ON/OFF the first switch SW1 by contacting an input portion I1 of the first switch SW1; and a second protrusion 782 in which its side projects in a thickness direction of the latch arcuately around the latch shaft 11 to contact a sliding projection 92 of the switch lever 9 depending on a rotary position of the latch 7.

In FIG. 3, between the front arm 72 and the rear arm 73 of the latch 7, there is formed a U-like engagement groove 79 in which the striker S in the striker-entering grooves 43, 51 comes.

The latch 7 is pivotally mounted between the base member 4 and the cover member 5 via the latch shaft 11. In FIGS. 4 to 9, the latch 7 rotates clockwise and counterclockwise between an open position or state where it disengages from the striker S; a full-latch position or state where it fully engages with the striker S; and a half-latch position or state where it slightly engages with the striker S from the full-latch position and prevents the latch 7 from turning to the open position. The latch 7 is urged by the spring 14 wound on the latch shaft 11 clockwise in FIG. 4 to release the striker S. (hereinafter called "in a striker-releasing direction")

By the structure, when the door D is closed, the striker S enters the engagement groove 79 of the latch 7 and makes the latch 7 rotate counterclockwise (hereinafter called "in a striker-engaging direction") against force of the spring 14.

In FIG. 3, the pawl 8 is elongate, and comprises an axial hole 81 in which the pawl shaft 11 or a second shaft in parallel with the latch shaft 11 is put; a sharpened portion 81 that is sharp at the end and engages with a pawl engaging portion 104 of the memory lever 10; a pawl portion 83 that engages with the full-latch engagement portion 74 or full-latch engagement portion 75 of the latch 7; a bent portion 84 that is bent toward the switch lever 9 at the side opposite the pawl portion 83 and can engage with an opening lever 22; and a spring engagement portion 85 with which one end of the spring 15 can engage.

The pawl 8 is pivotally mounted between the base member 4 and the cover member 5 via a pawl shaft 12. Thus, the pawl 8 rotates to a latch engagement position (engagement position: latch engagement state, holding state) where the pawl portion 83 can engage with the full-latch engagement portion 74 or half-latch engagement portion 75 in FIG. 4 and a latch releasing position (release position: latch release state) where the pawl portion 83 disengages from the full-latch engagement portion 74 or half-latch engagement portion 75 in FIG. 5.

In FIG. 2, the pawl shaft 12 has a flange 121 in the middle. The pawl 8 is mounted at one side with respect to the flange 121, while the switch lever 9 is mounted at the other side. The pawl 8 and the switch lever 9 are disposed on the same shaft.

Figure 4:
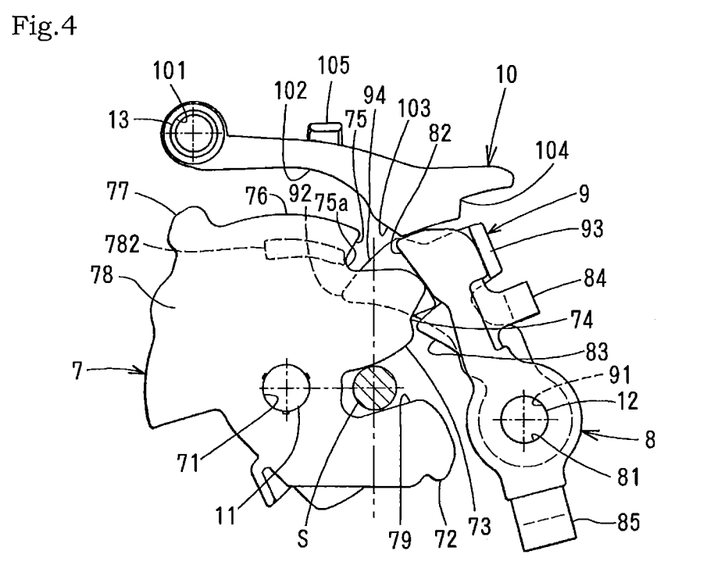
FIG. 4 is a bottom plan view of a main part of the door latch device when the door is closed.

The pawl 8 is biased by the spring 15 close to the pawl 8 with respect to the flange 121 of the pawl shaft 12 counterclockwise in FIG. 4 or in a rotational direction from a latch release position to a latch engagement position (called "latch engagement direction").

Accordingly, when the striker S engages in the engagement groove 79 by closing the door D, the pawl 8 is rotated in the latch engagement direction by the spring 15, thereby making the pawl portion 83 of the pawl 8 engage with the full-latch engagement portion 74 and holding the latch 7 in the full-latch position in FIG. 4.

In FIGS. 4 and 10, the switch lever 9 is shaped like a sector, and comprises an axial hole 91 in which the pawl shaft 12 or second shaft is put; a sliding projection 92 that is slidable on a second protrusion 782 of the molded portion 78 of the latch 7; a bent portion 93 which is bent toward the pawl 8 at the other surface of the sliding projection 92 and which can engage with the other side of the pawl 8 opposite to engagement with the latch; a switch contact portion 94 like a cam provided between the sliding projection 92 and the bent portion 93, the switch contact portion 94 coming in contact with an input portion 12 of the second switch SW2 to turn ON the second switch SW2 and not coming contact with the input portion 12 of the second switch SW2 to turn OFF the second switch SW2; and a notch 95 that allows rotation of the pawl 8 with swinging of the bent portion 93 and limits rotation of the pawl 8 by contacting the bent portion 93.

The switch lever 8 is rotationally mounted on the pawl shaft 12 by putting the pawl shaft 12 in the axial hole 91. The switch lever 9 rotates to "a switch-OFF state" in FIG. 10 where, when the latch 7 is positioned closer to an open position than the half-latch position, the switch contact portion 94 comes in contact with the input portion 12 of the second switch SW2 to turn ON the second switch SW2; to "a buffer position" in FIG. 11 where, when the latch 7 is in a half-latch state in which the latch 7 rotates from the open position to the half-latch position, the sliding projection 92 of the switch lever 9 is in contact with the second protrusion 782 of the latch 7 and rotates a little counterclockwise in FIG. 10 (in a switch-OFF direction described later) or a latch-releasing direction (releasing direction) opposite to the latch-engaging direction; and a switch-OFF position (switch-OFF state) in FIG. 12 where, when the latch 7 is the full-latch state, the sliding projection 92 of the switch lever 9 does not come in contact with the second protrusion 782 of the latch 7, but rotates clockwise in FIG. 10 (in a switch-OFF direction described later) to let the second switch SW2 OFF in FIG. 12 where the second switch SW2 is OFF.

When the latch 7 rotates from the open position to the half-latch position, the sliding projection 92 of the switch lever 9 comes in contact with the second protrusion 782 of the latch 7. In this case, the second protrusion 782 of the latch 7 may be changed in position to keep the switch lever 9 in ON position without rotating in the switch-OFF direction a little.

The switch lever 9 is biased by the spring 16 wound on the pawl shaft 12 close to the switch lever 9 with respect to the flange 121 of the pawl shaft 12 clockwise in FIG. 10 or in a direction where it rotates from the switch-OFF position to the switch-OFF position. (hereinafter called "switch-OFF direction")

Specifically, when the door is opened with a switch (not shown), the pawl 8 rotates in the latch-releasing direction opposite the latch engaging direction against force of the spring 15 to enable the latch to rotate from the full-latch position to the open position. By engaging the bent portion 93 with the pawl 8, the switch lever 9 follows rotation of the pawl 8 and rotates counterclockwise in FIG. 10 (hereinafter called "in a switch-OFF direction) against the force of the spring 16 to the switch-OFF position, so that the switch contact portion 94 comes in contact with the input portion 12 of the second switch SW2.

In FIG. 10, when the door D is opened, the pawl portion 83 of the pawl 8 slides on the back 76 of the latch 7 and the switch lever 9 is held in a switch "ON" position owing to engagement of the bent portion 93 of the switch lever 9 and the pawl 8. In FIG. 11, the latch 7 rotates to engage with the striker, and the pawl portion 83 of the pawl 8 is rotated by force of the spring 15 at the half-latch engagement portion 75. By releasing the bent portion 93 from the pawl 8, the switch lever 9 intends to rotate in a switch-OFF direction, and the sliding projection 92 of the switch lever 9 comes in contact with the second protrusion 782 of the latch 7. Thus, the switch lever is rotated a little in a switch-OFF direction to create a buffer position, so that the switch lever 9 is prevented from rotating and kept in a switch-OFF state.

When the latch 7 rotates in a striker-engaging direction, the switch lever 9 is released from limitation for rotation by leaving the sliding projection 92 of the switch lever 9 over the second protrusion 782 of the latch 7, and turns to the switch-OFF position, so that the switch contact portion 94 does not contact the input portion 12 of the second switch SW2.

Thus, a control portion (not shown) electrically connected to the second switch SW2 in the vehicle body B can securely determine that the latch 7 is not in the full-latch state owing to an ON signal from the second switch SW2, and securely determines that the latch 7 is in the full-latch state by not receiving or not detecting the ON signal. So, for example, when the latch 7 rotates from the full-latch position in a striker-releasing direction even slightly, an interior light (not shown) can be turned on by the ON signal.

In FIG. 11, the pawl portion 83 of the pawl 8 engages with the half-latch engagement portion 75, the sliding projection 92 of the switch lever 9 slidably contacts the second protrusion 782 of the molded portion 78 of the latch 7 by preventing the switch lever 9 from turning in the switch-OFF direction. By contacting the bent portion 84 of the pawl 8 with the notch 95 of the switch lever 9, the pawl 8 is prevented from rotation in the latch-engaging direction, so that the pawl 8 is stopped at a non-contact position in which the pawl 8 does not contact a bottom 75a although the pawl portion 83 contacts the half-latch engagement portion 75, Thus, sound is not generated when the pawl portion 83 contacts the half-latch engagement portion 75. When the sliding projection 92 of the switch lever 9 contacts the second protrusion 782 of the molded portion 78, sound is absorbed thereby keeping noise as low as possible.

The memory lever 10 is elongate and comprises an axial hole 101 in which a memory-lever shaft 13 or a third shaft parallel with the latch shaft 11 is disposed; a sliding surface 102 that faces an outer circumferential surface of the latch 7, the projection 77 of the latch 7 sliding on the sliding surface 102; a projection 103 that is continuously formed with the sliding surface 102 and projects toward the outer circumferential surface of the latch 7 or in a latch direction; a pawl engagement portion 104 which a sharp portion 82 of the pawl 8 can contact; and a spring engagement portion 105 which one end of the spring 17 contacts. The sliding surface 102 is gently curved with the projection 103.

The memory lever 10 is pivotally mounted via the memory-lever shaft 13 to be between a pawl-engagement position (pawl-engagement state) where the pawl-engagement portion 104 contact the pawl 8 a pawl-release position (pawl-release state) where the pawl-engagement portion 104 contacts the pawl 8.

The memory lever 10 is biased by the spring 17 wound on the memory-lever shaft 13 clockwise in FIG. 4 in a direction rotating from the pawl-release position to the pawl-engagement position (hereinafter called "pawl-engagement direction).

The spring 15 that biases the pawl 8 is set to keep its biasing force very strong. Even if the pawl 8 or pawl portion 83 is jumped up and rotated in the latch-releasing direction by the end of a rear arm of the latch 7 by rotating the latch 7 from the open position in the striker-engagement direction forcefully at high speed, the pawl 8 is not rotated by the spring 15 to a position where the memory lever 10 can engage. Thus, the pawl 8 can be turned without contacting the memory lever 10 to the latch-engagement position where the pawl portion 83 contacts the full-latch engagement portion 74. Even in this situation, the door D can be closed securely.

In the latch mechanism 2, the latch 7, pawl 8 and memory lever 10 are pivotally mounted on the base member 4 via the shafts 11, 12 13 parallel to one another so as not to overlap even in any operating states, thereby reducing thickness of the latch mechanism or getting smaller.

Electric Actuator

In FIGS. 2 and 3, the electric actuator 3 or door opening unit comprises a synthetic-resin casing member 6 that is open at the front and lower surfaces and the cover member 5 that covers the front surface of the casing member 6. The cover member 5 is also used for the latch mechanism 2. In a space between the casing member 6 and the cover member 5, there are provided a motor M as a drive source; a worm 18 fixed to a rotation shaft of the motor M such that the worm 18 reduces rotation speed of the motor M; a worm wheel 19 which meshes with the worm 18 and is rotationally mounted via a wheel shaft 20 supported by the cover member 5 and casing member 6; a spring 21 that returns the worm wheel 19 rotated after driving the motor M to an initial position by biasing the spring 21 in a direction contrary to a rotating direction with the motor M; the opening lever 22 pivotally supported via an opening-lever shaft 23 supported by the cover member 5 and casing member 6, one end of the opening lever 22 engaging with the worm wheel 19, the other end of the opening lever 22 engaging with the bent portion 84 of the pawl 8, thereby rotating the opening lever 22 with the motor M in a releasing direction for opening the door D to rotate the pawl 8 from the latch-engagement position to the latch-releasing position; a spring 24 that biases the opening lever 22 so that one end of the opening lever 22 engages with the worm wheel 19 any time; and a coupler 25 that transmits an ON/OFF signal from the first switch SW1 and the second switch SW2 to a control (not shown) in the vehicle body B, and supplies power into the motor M.

With door-opening action, the electric actuator 3 is actuated, and one end of the opening lever 22 engages with the bent portion 84 of the pawl 8. The opening lever 22 turns in the releasing direction, and the pawl 8 turns clockwise in FIG. 4 in the latch-releasing direction. Thus, the pawl portion 83 of the pawl 8 leaves the full-latch engagement portion 74. Hence, the door D can be opened.

A Series of Actions of Each Member when the Door Latch Device Operates

Then, in FIGS. 4 to 12, it will be described how to operate the door latch device 1 in this embodiment, especially a series of actions of each member when the door D opens and closes.

FIG. 4 is a door-closed state in which the pawl portion 83 of the pawl 8 engages with the full-latch engagement portion 74 of the latch 7 and the latch 7 fully engages with the striker S at the full-latch position. The memory lever 10 is biased by the spring 17 in the pawl-engagement direction and is in contact with the sharp portion 82 of the pawl 8. But the memory lever 10 is not held, so that the pawl 8 is rotatable toward the latch-release position with opening action for the door D.

Figure 5:
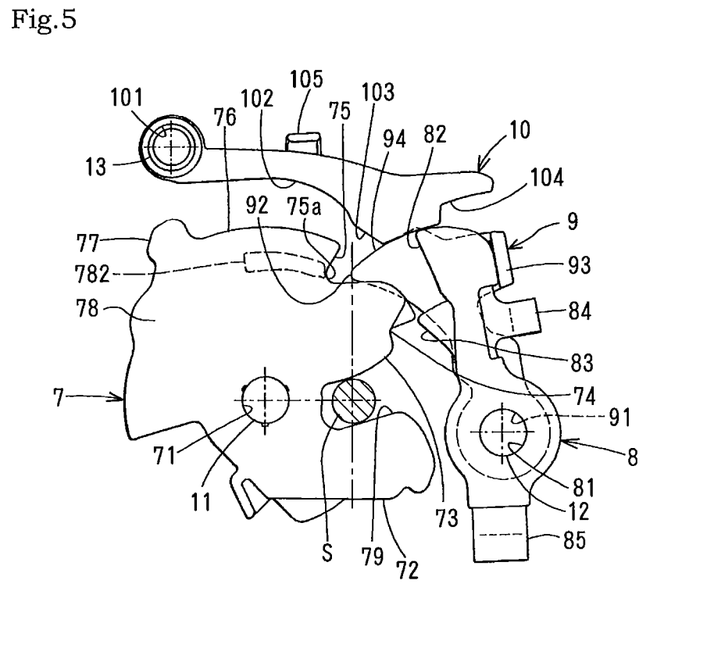
FIG. 5 is a bottom plan view of the main part of the door latch device when a pawl rotates from FIG. 4 to a latch-engagement position.

In the closed state of the door D in FIG. 4, according to an opening action for the door D, as shown in FIG. 5, the pawl 8 rotates in the latch-release direction against the spring 15, and the pawl portion 83 of the pawl 8 disengages from the full-latch engagement portion 74 of the latch 7 in the latch release state, in which the latch 7 is able to rotate in the striker-release direction.

Figure 6:
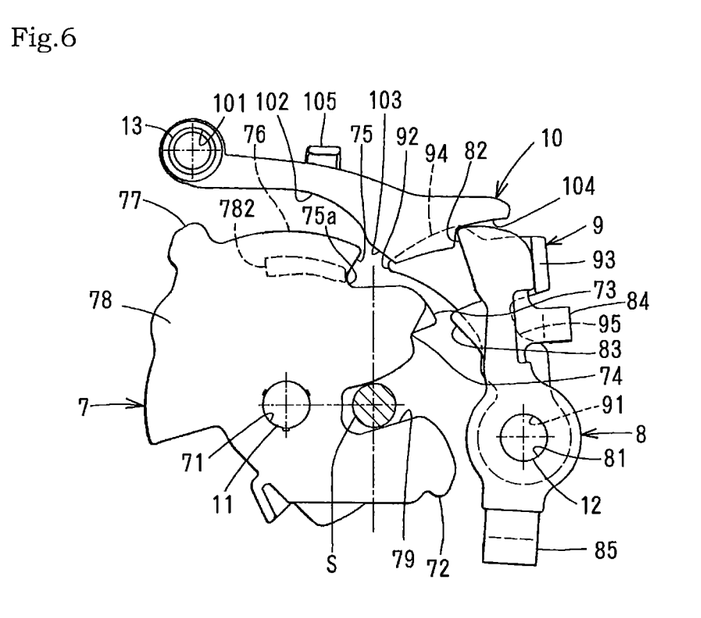
FIG. 6 is a bottom plan view of the main part of the door latch device when a memory lever rotates from FIG. 5 to a pawl-engagement position.

In FIG. 6, at the full-latch position of the latch 7, in order to open the door D, the pawl 8 rotates to the latch release position, and the memory lever 10 is rotated in the pawl-engagement direction by the spring 17 to become pawl-engagement state in which the pawl engagement portion 104 of the memory lever 10 engages with the sharp portion 82 of the pawl 8. Thus, the pawl 8 is held at the latch release position against the spring 15.

Figure 7:
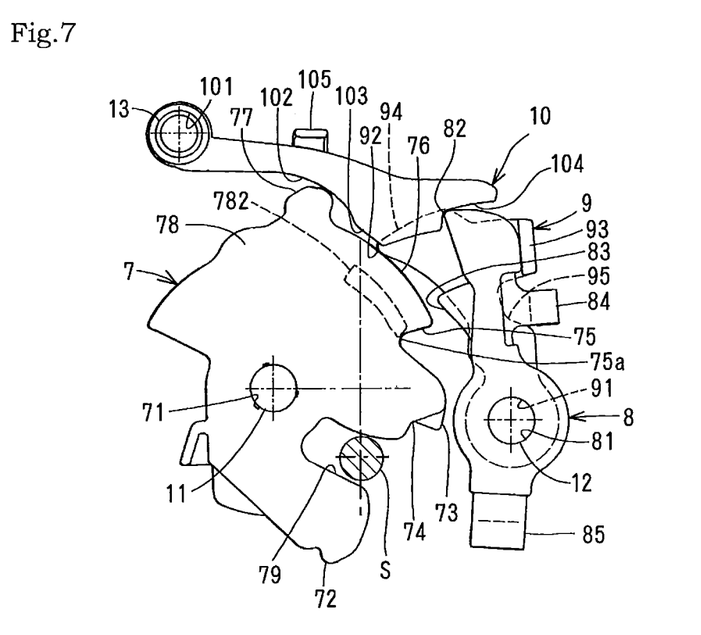
FIG. 7 is a bottom plan view of the main part of the door latch device when a latch rotates in a striker-release direction and starts pushing up the memory lever.

The latch 7 rotates in the striker-release direction from FIG. 6 to FIG. 7, and the projection 77 of the latch 7 slides on the sliding surface of the memory lever 10. The projection 77 of the latch 7 slides on the sliding surface 102 and gradually pushes up the memory lever 10 against the spring 17 in the pawl release direction.

Figure 8:
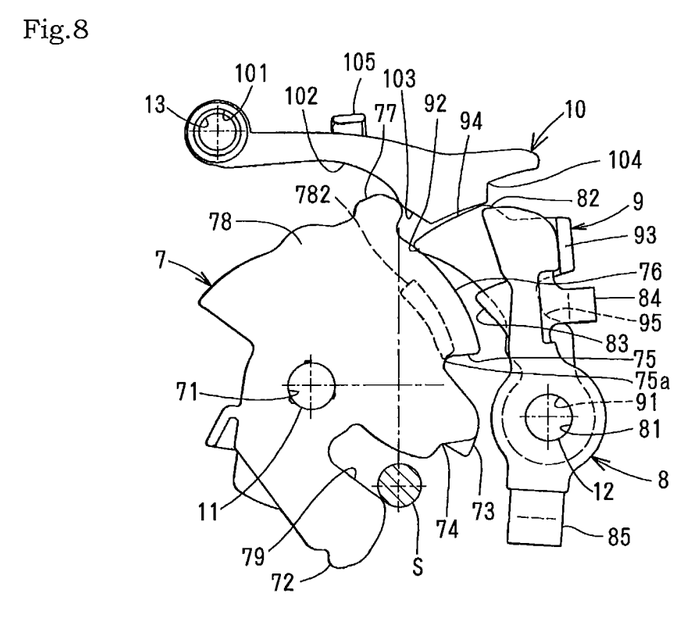
FIG. 8 is a bottom plan view of the main part of the door latch device when the latch further rotates in the striker-release direction and finishes pushing up the memory lever.

The latch 7 rotates in the striker-release direction from FIG. 7 to FIG. 8 in which the pawl portion 83 of the pawl 8 goes over the half-latch engagement portion 75 to be between the half-latch position and the open position. The projection 77 of the latch 7 comes in contact with the projection 103 of the memory lever 10 and pushes up in the pawl-release direction. Thus, the memory lever 10 rotates and leaves the pawl 8 to release the pawl-holding state and to become a pawl-release state.

Figure 9:
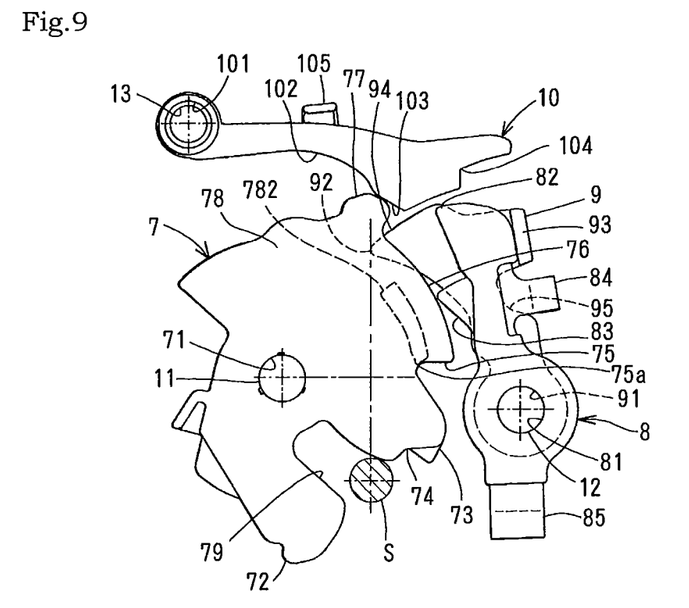
FIG. 9 is a bottom plan view of the main part of the door latch device when the latch further rotates in the striker-release direction to an open state.

The latch 7 rotates in the striker-release direction from FIG. 8 to FIG. 9. In the latch release position of the pawl 8, the pawl portion 83 of the pawl 8 relatively slides on the back 76 of the latch 7. The latch 7 is placed in an open position to release the striker S.

Thus, the door can securely be opened with a single action without engagement of the pawl portion 83 of the pawl 8 with the full-latch engagement portion 74 or half-latch engagement portion 75 of the latch 7.

When the pawl 8 goes over the half-latch engagement portion 75, the pawl 8 is biased by the spring 15 in the latch engagement direction, and the pawl portion 83 of the pawl 8 comes in contact with the back 76 of the latch 7. When the door is closed at the state, the pawl portion 83 of the pawl 8 securely engages with the half-latch engagement portion 75 or full-latch engagement portion 74.

In FIG. 10 in which the latch 7 releases the striker S in the open state, the switch lever 9 is to be rotated by the spring 16 in the switch-OFF direction, but its rotation is prevented and is held in the switch-OFF position where the switch contact portion 94 of the switch lever 9 is in contact with the second switch SW2.

In the half-latch state in FIG. 11 where the latch 7 rotates in the striker-engagement direction from FIG. 10 to make the pawl 8 engage with the half-latch engagement portion 75, the switch lever 9 is to be rotated by the spring 16 in the switch-OFF direction. But the sliding projection 92 of the switch lever 9 comes in contact with the second protrusion 782 of the latch 7, the switch lever 9 rotates a little in the switch-OFF direction to form a buffer zone, so that its rotation is prevented thereby holding contact of the switch contact portion 94 of the switch lever 9 with the second switch SW2.

The bent portion 84 of the pawl 8 contacts the notch 95 of the switch lever 9 thereby preventing the pawl 8 from rotating. Thus, the pawl portion 83 of the pawl 8 engages in the half-latch engagement portion 75, but is prevented from impacting the bottom 75a, thereby reducing noise when the pawl 8 engages with the half-latch engagement portion 7 of the latch 7.

The latch 7 rotates in the striker-engagement direction from FIG. 11 to FIG. 12 in the full-latch state where the pawl 8 engages the full-latch engagement portion 74. The second protrusion 782 for preventing the switch lever 9 from rotating is not in rotation scope. So the switch lever 9 is rotated in the switch-OFF direction by the spring 16 to the switch-OFF position where the switch contact portion 94 of the switch lever 9 does not contact the second switch SW2.

Accordingly, the control in the vehicle body B determines through an ON signal or an OFF signal from the second switch SW2 whether the pawl 8 engages with the full-latch engagement portion 74 or half-latch engagement portion 75.

In the open position or state and the half-latch position or state of the latch 7 in FIGS. 10 and 11, the first protrusion 781 of the latch 7 is in contact with the first switch SW1 which is ON.

At the full-latch position or state in FIG. 12, the first protrusion 781 of the latch 7 is not in contact with the first switch SW1 which is OFF.

Thus, the control in the vehicle body B can detect whether the latch 7 is at the open position, half-latch position or full-latch position through an ON signal or an OFF signal from the first switch SW1.

In order to trigger turning on/off interior lights, it may be determined whether to use the first switch SW1 for detecting a rotational position of the latch 7 or the second switch SW2 for detecting a rotational position of the switch lever 9.

The present invention may be applied to a side door or a sliding door in a car instead of the liftgate.

In this embodiment, the first protrusion 781 and second protrusion 782 are provided on the molded portion 78, but may be formed directly together with the latch 7.

What is claimed is:

1. A motor vehicle door latch device comprising:
a latch mechanism that engages with a striker to hold a door closed;
door-opening means that disengages the latch mechanism from the striker; and
the latch mechanism comprising:
a latch that is pivotally mounted via a first shaft for rotation between an open position, a half-latch position, and a full-latch position and engages with the striker;
a pawl that is pivotally mounted via a second shaft, rotates to an engagement position in which the pawl engages with a full-latch engagement portion and a half-latch engagement portion of the latch, respectively, to hold the latch in the full-latch position and the half-latch position, respectively, and rotates in a releasing direction to enable the latch to rotate from the full-latch position and the half-latch position, respectively;
a memory lever that is pivotally mounted via a third shaft so as not to axially overlap with the latch and the pawl wherein when the pawl rotates in the releasing direction from the full-latch engagement portion and the half-latch engagement portion of the latch, respectively, toward a release position based on an action of the door-opening means, the memory lever enables the pawl to be held in the release position in which the pawl cannot engage with the full-latch engagement portion and the half-latch engagement portion, while the latch rotates from the full-latch position and the half-latch position, respectively, to the open position; and
a switch lever that is pivotally mounted via the second shaft, and is biased to rotate towards the latch so as to come in contact with the latch, wherein when the latch rotates from the open position to the half-latch position, the switch lever stops the pawl, such that the pawl is held at a non-contact position in which a pawl portion, formed as a convex shape on the pawl, engages with the half-latch engagement portion, which is formed as a concave shape in the latch, but does not contact with a bottom of the half-latch engagement portion, thereby holding the latch in the half-latch position,
wherein the latch forms a protrusion projecting in a thickness direction of the latch and having an outer circumferential surface facing a direction in which the switch lever is biased towards the latch, and wherein as the latch rotates from the open position to the half-latch position, the switch lever contacts with the protrusion so that the outer circumferential surface of the protrusion stops biased movement of the switch lever towards the latch, such that the switch lever stops the pawl at the non-contact position.

2. The motor vehicle door latch device according to claim 1, wherein the switch lever comprises a sliding projection which slidably contacts with the outer circumferential surface of the protrusion of the latch to make the pawl stop at the non-contact position.

3. The motor vehicle door latch device according to claim 2, wherein the switch lever comprises a notch, the pawl comprises a bent portion, and the pawl is prevented from rotation in a latch-engaging direction by contacting the bent portion of the pawl with the notch of the switch lever so that the pawl is stopped at the non-contact position in which the pawl does not contact with the bottom of the half-latch engagement portion.

4. The motor vehicle door latch device according to claim 1, wherein a switch is provided in a rotation scope of the switch lever so as to contact with the switch lever, and a part of the switch lever being in a contact state or non-contact state with the protrusion according to a rotational position of the latch thereby causing another part of the switch lever to contact or not to contact the switch to turn the switch on or off.

5. The motor vehicle door latch device according to claim 4, wherein the switch is used to turn on or off an interior light of a motor vehicle, and the interior light is switched to turn off when the latch is at the full-latch position.

6. The motor vehicle door latch device according to claim 1, wherein the pawl portion, formed as the convex shape on the pawl, engages with the half-latch engagement portion, formed as the concave shape in the latch, at the non-contact position, but a part of the full-latch engagement portion of the latch closest to the pawl does not contact with the pawl.

7. The motor vehicle door latch device according to claim 1, wherein the pawl is biased towards the latch, and when the door-opening means causes the pawl to rotate to the release position, the latch rotates from the full-latch position toward the open position as the door is opened, such that during the rotation of the latch from the full-latch position toward the open position, the half-latch engagement portion of the latch moves past the pawl portion of the pawl such that the half-latch engagement portion is positioned relative to the pawl portion so that when the door is closed again, the pawl portion is positioned so as to be engageable with the half-latch engagement portion of the non-contact position.

* * * * *